United States Patent Office 3,331,247
Patented July 18, 1967

3,331,247
APPARATUS FOR MEASURING TEMPERATURES WITHIN ROTARY KILNS
Hans Dieter F. Toepell, Toronto, Ontario, Canada, assignor to Metallgesellschaft Aktiengesellschaft, Frankfurt am Main, Germany, a corporation of Germany
Filed June 22, 1966, Ser. No. 559,546
Claims priority, application Germany, June 30, 1965, M 65,746
9 Claims. (Cl. 73—351)

ABSTRACT OF THE DISCLOSURE

Apparatus for measuring temperatures within a rotary kiln by means of individual thermocouples stationed at locations within the kiln, each thermocouple having one terminal connected to a common continuous slip ring mounted on the kiln, and another terminal connected to a separate segment of a segmented slip ring also mounted on the kiln to permit transfer of the thermocouple signal voltages to an external receiver in a sequential sampling sequence through brushes contacting the two slip rings. The sampling of each new thermocouple signal in the sequence is indicated by the operation of a switch positioned for actuation by cam-like projections of the slip ring segments as the kiln rotates.

This invention relates in general to temperature measuring systems and more particularly to an apparatus for measuring temperatures within rotary kilns while either stationary or rotating. In addition, the invention provides for determining the degree of filling of such rotary kilns through temperatures measured at various locations therein.

Essentially, the temperature measuring apparatus of the invention uses one or more thermocouples disposed at characteristic locations within the rotary kiln for sensing the temperatures thereat and generating electrical signal voltages corresponding to such temperatures. To provide for the external transfer of the temperature signal voltages generated by these individual thermocouples, the invention provides two slip ring members which are mounted to the kiln for rotation therewith, one of these slip ring members being conductively continuous and the other slip ring member being subdivided into a plurality of ring segment portions each electrically insulated from one another and form the continuous slip ring member. The subdivided slip ring member has a number of segments at least equal to the number of thermocouples so that there will be a sufficient number of such segments to allow each thermocouple to be conductively connected to a corresponding segment as well as to the continuous slip ring member for applying its temperature signal voltage thereacross. The temperature signal voltages of the various thermocouples are transferred to an external signal receiving means, such as a recorder, by means of a pair of brushes. One of these brushes is disposed for conductive wiping contact engagement with the continuous slip ring member, and the other brush is disposed at a position along the movement path of the segment slip ring member for conductive wiping contact engagement with the segments passing by this position as the kiln rotates.

By connecting one output terminal of each thermocouple to the continuous slip ring, in effect that slip ring becomes a common ground for all thermocouples, and such common ground connection is transferred to the external signal receiver via the rotary electrical coupling afforded by the brush which contacts the continuous slip ring. Because this slip ring is electrically continuous, the signal receiver is continuously maintained in a common ground connection to all thermocouples, regardless of whether the kiln is rotating or standing still, and independently of the angular position of brush contact about the kiln rotation axis.

By connecting the other output terminal, i.e. the ungrounded or "hot" terminal of each thermocouple to an assigned segment of the segmented slip ring, a multitude of temperature signal voltages can be carried by a single ring and sensed in sequence by a single brush. This brush which contacts the segmented slip ring in effect provides for the sequential sampling of the individual temperature signal voltages in accordance with the rotation of the kiln, since as each segment passes into registry with this brush, the signal voltage of the thermocouple associated with such segment is transferred to the external signal receiver.

As thus far described, the invention provides an apparatus whereby temperature signal voltages from thermocouples mounted within a rotary kiln may be coupled sequentially to a stationary external signal receiver. Since these temperature signal voltages are not available continuously during rotation of the kiln, it is extremely desirable to provide a means for indicating a change, or impending change in the segment being contacted by the segmented ring sensing brush. For such purpose, the invention generally provides one or more switch actuating members, but preferably one switch actuating member per segment, mounted to the kiln for rotation therewith in unison with both slip rings. Each switch actuating member is disposed in a position of registry with respect to an assigned segment. A switching means disposed at a predetermined position along the movement path of the switch actuating members is engaged thereby to establish a predetermined switching state whenever the segment associated with the engaging switch actuating member is in a predetermined rotational position with respect to the position of registry with the segment sensing brush.

Many processes carried out in a rotary kiln require an exact temperature control because the variation of temperature with respect to time and location within the kiln is of great importance. For this reason, it is known and conventional to provide a number of thermocouples at different points of the kiln for sensing and registering the variation of temperature at these points with respect to time. The voltage across such thermocouples is usually sensed with the aid of slip rings and collector brushes. One slip ring is usually employed for the common ground connection of all thermocouples whereas the other output terminal of each thermocouple is connected to a separate, continuous slip ring, commonly designated as a "sensing ring." To keep the considerable expenditure involved in the overall temperature and recording device within tolerable limits, it is also known to divide the sensing rings into separate, semicircular sections, each of which is connected to a different thermocouple so that only half the number of complete sensing rings ordinarily used is required. With the same general object in mind, it is also known to use a multi-recorder, in most cases a multicolor-recorder, for jointly recording the temperatures which have been sensed by the various thermocouples. Such a multi-recorder senses and records in a recurring sequence and in uniform intervals of time the temperatures that have been sensed by the various thermocouples.

This known method of sensing and recording has the disadvantage that the recording sequence of the apparatus is fixed and is not synchronized with the rotation speed of the kiln which is often variable. For this reason, the slip ring section associated with a given thermocouple may not lie under the collector brush at the time at which the multicolor-recorder is ready to record the temperature sensed by such thermocouple. Although a relay may be used to check whether the proper slip ring section is under the collector brush at the correct time, there is still a significant possibility for large errors in the measurement of temperatures because the thermocouple involved may not yet be covered by the kiln charge at the time when its sensed temperature is recorded. Ordinarily, in the operation of rotary kilns, the hottest portions within the kiln are those which are not covered by the material charge therein, and therefore in cases where it is desired to measure charge temperature, the recording of the temperature sensed by an uncovered thermocouple will result in an error because such temperature will not really be a charge temperature but rather the higher temperature of the kiln internal atmosphere.

The present invention provides an improved apparatus for sensing and recording temperatures as by a multi-recorder, which temperatures are sensed at different points of the rotary kiln by thermocouples. This apparatus avoids the aforementioned disadvantages of the prior art and requires fewer complete slip rings.

According to a preferred embodiment of the invention, only two slip rings and two collector brushes are required for all thermocouples installed in the rotary kiln. One of these slip rings consists just as in prior art apparatus, of a simple electrically continuous ring and serves as a thermocouple ground connection. The other slip ring is divided into electrically separate segments equal in number to the number of thermocouples. Each segment is connected to an assigned thermocouple. In addition, each slip ring segment has associated with it a switch actuating member, which is firmly connected to the shell of the kiln and protrudes out therefrom and by the rotation of the kiln is caused to actuate a stationary switch disposed externally with respect to the kiln. This switch actuating member is preferably connected to the ring segment or forms a portion thereof, such as for example a protruding cam-shaped portion. Alternatively, the switch actuating member can be directly or indirectly connected to the periphery of the kiln by any other suitable means and need not be on the same radius of the kiln as the associated ring segment. In this preferred embodiment, it is essential however that the angular spacings between all switch actuating members are the same as those between their associated ring segments.

With the apparatus of the instant invention, the multi-recorder used in conjunction therewith is not restricted to operation in accordance with a rigid cycle but is rendered operative for one temperature measurement and recording whenever it receives a signal from the switch upon actuation by one of the switch actuating members associated with the slip ring segments. When the measurement and recording of a particular thermocouple temperature signal has been completed, the multi-recorder is then switched to the next channel or color and remains inoperative until it receives another signal from the switch. In such an operating arrangement, the temperature signal voltage of each thermocouple can be sensed at exactly the same point with respect to the kiln rotation axis, such as for example shortly before the thermocouples emerge from the kiln charge, or when the thermocouples are under a maximum depth of kiln charge.

The apparatus of the invention may furthermore be utilized for making exact measurements of the degree to which the kiln is filled with a charge, by comparison of the temperatures sensed by thermocouples disposed at various angular positions about the kiln rotation axis. It is possible to measure not only the average degree of filling of the kiln, but also the degree of filling at selected locations thereof.

The invention provides a temperature sensing apparatus which can be widely varied as to the geometrical arrangement of its thermocouples, segment-to-thermocouple connections, segment sensing brush position, and switch actuating member-to-segment positions. For a simpler understanding of the invention, it is convenient to regard each thermocouple as being disposed to measure temperature at a location within the kiln given by an axial station coordinate indicating the position of the thermocouple with respect to the length dimension of the kiln rotation axis, and by an angular coordinate indicating the angular position of a radial plane through the kiln axis and through the thermocouple with respect to a reference radial plane passing through a predetermined point on the kiln. This reference radial plane will of course rotate about the kiln axis in unison with the kiln, and is therefore not fixed in space. Consequently, the position of each thermocouple with respect to the kiln itself is fixed and can be identified by a set of two coordinates, namely an angular coordinate and an axial coordinate.

The positions of the slip ring segments can be characterized in a similar manner as to their angular positions with respect to the same reference radial plane used for identfying the thermocouple positions. However, in the case of the slip ring segments, they in general will lie in a common plane transverse to the kiln rotation axes, i.e. that of the slip ring which they constitute, and these segments will each necessarily have a finite arc length, which gives them a corresponding angular coverage. It is therefore, more proper for each segmented slip ring to identify each segment thereof by the angular position of its leading end (determined from the direction of kiln rotation) and the coverage angle of its arc length. For any single segmented slip ring, the sum of the coverage angles of all its segments must necessarily be less than 360°, since the electrical insulation requirement between adjacent segments prohibits them from being exactly contiguous. Preferably, the segments are equal in their coverage angles and arc lengths for uniformity of construction. The magnitudes of the segment coverage angles determine the sampling duration times of their respectively associated thermocouple temperature signal voltages for a given rate of kiln rotation. In the apparatus of the invention, the maximum number of thermocouples which can be accommodated for a single segmented slip ring will of course depend on the segment angular coverage to be allowed for each thermocouple. If more thermocouples are to be installed, either additional segmented slip rings must be provided, or the segment angular coverage allocated to each thermocouple must be reduced proportionally to allow the use of a single segmented ring.

Each switch actuating member can be regarded as having a definite point of switch actuation which when in registry with the associated switching means will effect a change of switching state therein. Accordingly, the switch actuating members are best identified in terms of the angular position of their respective actuation points, as referred to the aforesaid reference radial plane.

The kiln axis of rotation can be regarded as being fixed in space, at least with respect to the actuating position of the switching means, and a contact position of the brush which wipes the segmented slip ring. Accordingly, the switch actuating position and this brush contact position can be identified by angular coordinates about the kiln axis with respect to a fixed reference plane, i.e. vertical or horizontal, passing therethrough.

Although to maintain short connection lead length between the individual thermocouples and their respetive segments, each thermocouple is preferably and ordinarily located at an angular position close to that its associated segment, and most preferably at an angular position within the angular coverage of such segment, nevertheless, within the general contemplation of the invention there can be an angular displacement between the thermocouples and their segment leading end locations. Likewise, there can be angular displacements between the segment leading ends and the actuation points of corresponding switch actuating members.

Thus, as the kiln is rotated from an initial position, the temperature signal voltage of any particular thermocouple will be applied to the external signal receiver when the leading end of the segment associated with said thermocouple is brought into wiping contact engagement with the segmented ring sensing brush. This is true regardless of any angular displacements between the thermocouple and the segment leading edge as may cause the temperature signal voltage to be first applied to the signal receiver either in advance, or after the arrival of the thermocouple into registry with the contact position of the sensing brush. The temperature signal voltage of such thermocouple will continue to be applied to the signal receiver for such time as the sensing brush remains in conductive contact with any portion of the segment, and such signal sampling time will in general be established by the angular coverage of the segment and the kiln rotation rate.

Within the general scope of the invention, the change of switching state effected by the actuating member associated with a particular segment can be made to occur either in advance of initial temperature signal sensing by the brush, in coincidence therewith, or after such initial temperature signal sensing, as desired.

To effect a change of switching state coincident with the initiation of temperature signal sensing, the angular displacement between the actuating member and the segment leading end is made equal to, and in the same sense as the angular displacement between the switching means and the sensing brush, so that when the segment leading edge arrives in registry with the sensing brush, the actuating member simultaneously engages the switching means.

Similarly, to provide switching action in advance or after the initiation of temperature signal sensing, the actuating member-to-segment leading end angular spacing can be made respectively greater or less than the switching means-to-sensing brush angular spacing.

This switching action coordinated with the temperature signal sensing on segments provided with associated switch actuating members is extremely useful for controlling the operation of external signal receivers such as multi-recorders because it provides an independent switching state indication for keeping track of which thermocouple signal is being recorded. For example, where a switch actuating member is provided for each segment, the switching means engaged by these actuating members can be connected to operate a stepping relay for applying temperature signals from the various thermocouples to pre-assigned recorder channels.

It is therefore, an object of the invention to provide an apparatus for sensing and measuring temperatures at locations within a rotary kiln.

Another object of the invention is to provide an apparatus as aforesaid whereby such temperatures can be measured without any interference with the rotary movement of the kiln.

A further object of the invention is to provide an apparatus as aforesaid whereby such temperatures are converted into electrical analogue signals and transferred to an external signal receiver for read out and recording thereby.

A further object of the invention is to provide an apparatus as aforesaid which can accommodate the sensing of a multitude of temperatures at various assigned axial and angular positions with respect to the kiln rotation axis.

A further object of the invention is to provide an apparatus as aforesaid including slip ring means for transferring such temperature signals to an external receiver.

A further object of the invention is to provide an apparatus as aforesaid whereby two complete slip rings can be used for transferring a greater number of temperature signals on a sequential sampling basis to an external receiver.

Still another and further object of the invention is to provide an apparatus as aforesaid whereby a plurality of temperature signals can be sampled simultaneously to establish the degree to which the kiln is filled with a charge.

Other and further objects and advantages of the invention will become apparent from the following detailed description and accompanying drawings in which.

Figure 1:
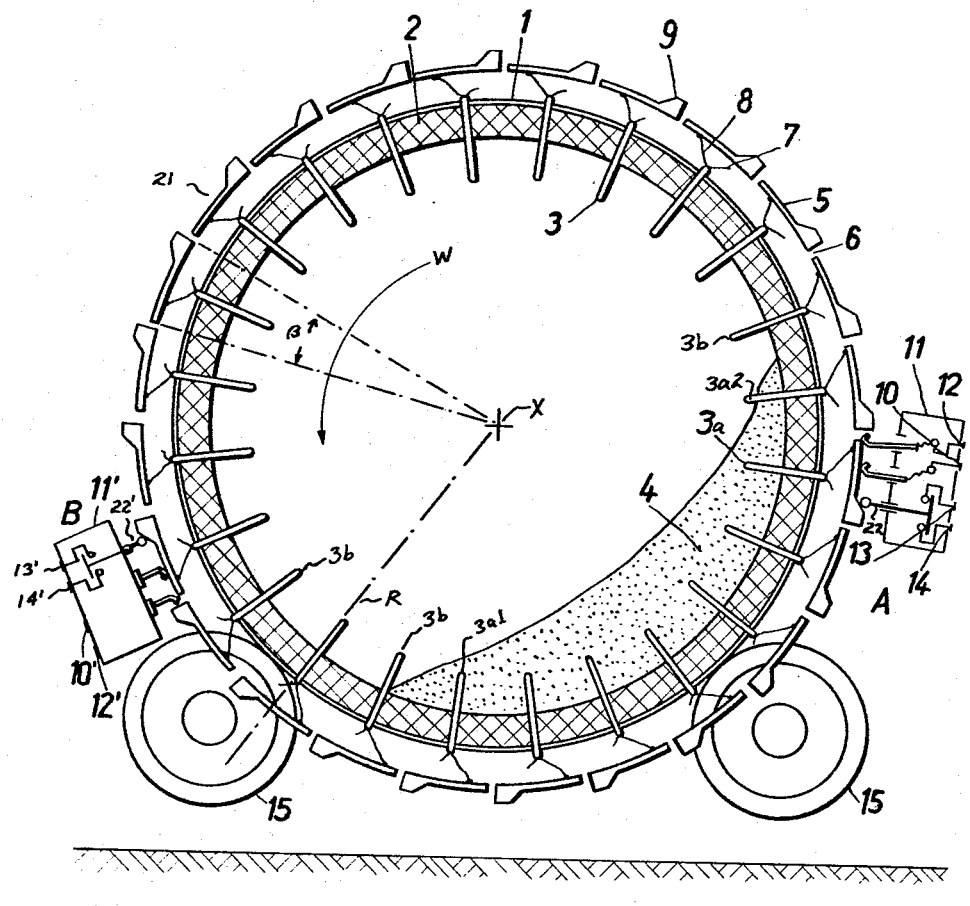
FIG. 1 is a transverse elevation section view of a rotary kiln provided with a temperature measuring apparatus according to a preferred embodiment of the invention.
Figure 2:
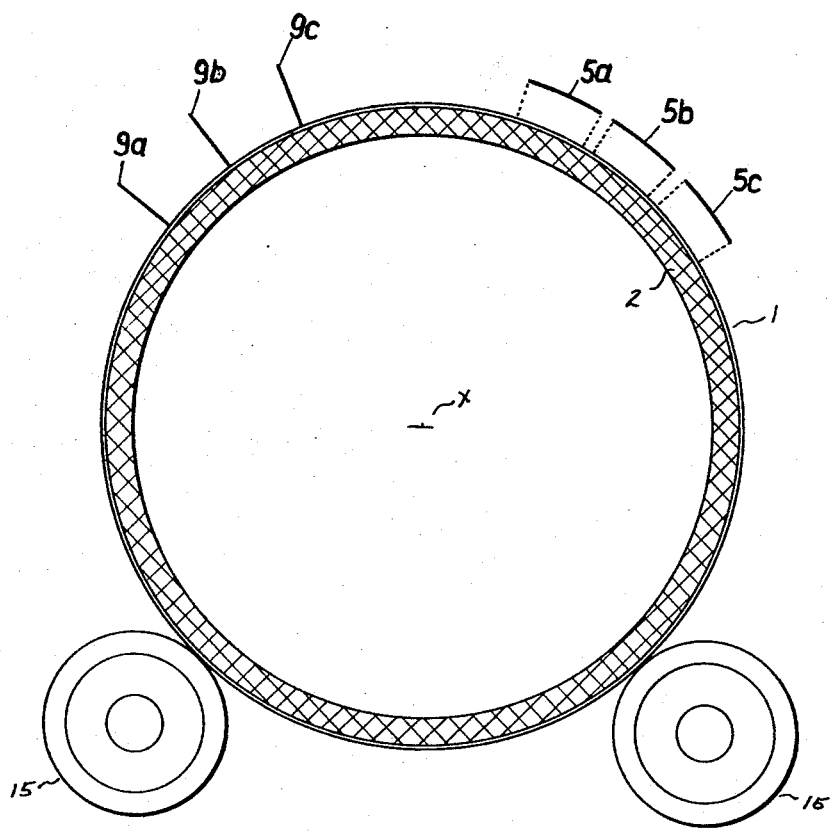
FIG. 2 is a schematic transverse elevation section view of the rotary kiln and a detailed portion of the temperature measuring apparatus shown in FIG. 1.

Referring now to FIGS. 1 and 2, a rotary kiln 1 having a refractory lining 2 encased by its exterior shell is arranged to rotate in the direction of the arrow W about its longitudinal axis X. The kiln 1 is provided with a plurality of thermocouples 3 mounted at various individual locations within the kiln 1 for sensing the temperature thereat. In general, as the kiln 1 rotates, some of the thermocouples 3 will be covered by the charge 4 therein, and other thermocouples will be exposed to the internal gaseous atmosphere of the kiln 1. Ordinarily, the charge 4 temperatures will be lower than the kiln 1 atmosphere temperatures, a physical phenomenon which enables the free surface of the charge 4, and hence the degree of kiln 1 filling to be determined by comparing temperature measurements taken from thermocouples 3 arranged in a consecutive circumferential pattern at various axial station planes in the kiln 1. For example, as shown in FIG. 1, the group of thermocouples identified as $3a$ are in contact with the charge 4, which has generally the flow properties of a granular material, and thus these thermocouples $3a$ will sense charge 4 temperatures which are markedly lower than the gas temperatures sensed by the remaining thermocouples identified as $3b$. Consequently, the free surface of the charge 4 can be established as extending chordwise across the interior of the kiln 1 between the extreme charge sensing thermocouples $3a1$ and $3a2$.

Within the scope of the invention, the thermocouples 3 need not be restricted to locations in a single axial station plane, but can generally be arranged to sense temperatures around the internal periphery of the kiln 1 at several axial station planes thereof to provide information as to the angular (about axis X) and the axial distribution of temperature within the kiln 1. For example, the 24 thermocouples 3 shown in FIG. 1 could be expediently arranged in circumferential groups of 8 thermocouples spaced 45° apart, with each group being located in a common axial station plane. In general, the thermocouples 3 can be conveniently identified in terms of a set of two coordinates, namely an angular coordinate as measured with respect to a reference radial plane R on the kiln, and in terms of an axial station plane coordinate measured parallel to the axis X. This permits unique identification of each thermocouple 3 in terms of its position on the kiln 1 itself, and independently of the rotational attitude of the reference plane R on the kiln 1 with respect to fixed space, i.e. the horizontal or vertical plane.

Each of the thermocouples 3 is essentially a two terminal electrical voltage generator which produces an output signal across its two terminals that corresponds to the temperature sensed by such thermocouple 3. Consequently, to effectively utilize the temperature signal information of the several thermocouples, it is necessary to transfer their individual signal voltages to an external signal receiving means, such as a recorder and/or read-out indicator (not shown). Preferably, a conventional multi-channel recorder is used so that each thermocouple temperature signal can be monitored individually.

For the purpose of accommodating such signal transfer from the rotatable kiln 1 to a stationary external signal receiver, slip ring means, mounted to the kiln 1 for rotation therewith about axis X, are provided. This slip ring means includes an electrically continuous slip ring 6 (shown in phantom because it is not located in the section plane of FIG. 1), and a segmented slip ring 21. One terminal 7 of each thermocouple 3 is connected to the continuous slip ring 6 so that said slip ring 6 serves as a common ground connection for all thermocouples 3. The other terminal 8, i.e. the ungrounded or "hot" terminal of each thermocouple 3 is connected to a corresponding segment 5 of the segmented slip ring 21. The segments 5 which constitute the complete slip ring 21 are electrically insulated from one another and from the ground slip ring 6. This assures that the temperature signal voltage of each thermocouple 3 will be applied between the ground slip ring 6 and the segment 5 assigned to such thermocouple 3, and precludes short circuiting of any thermocouple.

For each segment 5, a switch actuating member mounted for rotation with the kiln 1 is provided. These switch actuating members are expediently constructed in the form of cam-like portions 9 protruding from each segment 5, but can be separately mounted elements, if desired.

A control and sensing box 11 disposed stationary with respect to the kiln 1 axis X at a location external thereto designated as A, serves for supporting a pair of collector brushes 10 and 12 and a switching means 22 having a normally closed contact set that maintains a normally closed circuit condition between an associated pair of terminals 13 and 14. The brush 10 is disposed for conductive wiping contact engagement with the ground slip ring 6, and the brush 12 is disposed for conductive wiping contact engagement with the segments 5 of slip ring 21. Switching means 22 is disposed for engagement by the cam portions 9 on segments 5 as they pass by position A as the kiln rotates.

The brushes 10 and 12 are connected to the signal input terminals of a recorder or read-out indicator. Because brush 10 wipes upon the continuous slip ring 6, such recorder, etc., will have a somewhat permanent ground connection with all thermocouples 3 that will be uneffected by the rotation of the kiln 1 or its angular attitude when stationary. Therefore, the temperature signal available for recording at any given time will depend upon which segment 5 is in conductive contact with the brush 12.

Under normal operation with the kiln 1 rotating, the temperature measuring apparatus of the invention provides a sequential sampling of the thermocouple 3 temperature signal voltages with the duration of each sampling interval being dependent upon the angular coverage β of the various segments 5 and the rotation rate of the kiln 1. For the particular embodiment represented by FIG. 1, wherein the angular coverages β of all segments 5 are equal, each of the 24 thermocouple 3 signals will be sampled once each revolution for a period of 1/24 of the revolution period, neglecting the effect of such separation spaces as are necessarily provided for insulation between adjacent segments 5 to prevent short circuiting.

For the FIG. 1 embodiment, and the direction W of kiln 1 rotation shown therein, the initiation of temperature signal sampling for each segment by the brush 12 will be preceded by an actuation of the switching means 22 by the cam portion 9 of the preceding segment 5. This is particularly useful, since it provides a positive and independent identification of the change over from sampling the tempertaure signal on one segment 5 in advance of the actual sampling of the temperature signal on the succeeding segment 5. Each time the switching means 22 is actuated by a cam portion 9, a momentary change in the normal switching state as seen by terminals 13 and 14 occurs. This change of switching state can be utilized by the external recording instrumentation to correlate temperature signal recording with the proper thermocouple 3.

For example, in a multicolor, or multiple pen recorder such as is manufactured by the Sanborn Company in the United States, and commonly used for recording plural input electrical analogue data signals, the change of switching state appearing across terminals 13 and 14 can be used to operate a stepping relay (not shown) such as a Ledex type rotary stepping switch relay, to apply the temperature signal from each segment 5 to a pre-assigned recording pen channel. Even with a single pen channel recorder, such a stepping relay can be used in conjunction with the switching means 22 to apply an identifying marker signal to the recorder pen just prior to the time when it begins to record the temperature signal from the next segment 5.

Thus, for the case of the specific arrangement shown in FIG. 1, the actuation of the switching means 22 by a cam portion 9 results in the transmission of a signal to the recorder such that at the same time or immediately thereafter the two brushes 10 and 12 sense the temperature signal voltage between the slip ring 6 and the segment 5 following the one bearing the cam portion 9 that actuated the switching means 22. The recorder does not necessarily have to include an independent timing means but rather can be controlled by the switching state appearing across terminals 13 and 14. When this switching state is an open circuit, a relay (not shown) can be made to deenergize and thereby cause the recorder to record the temperature signal voltage which is then being sensed by the brushes 10 and 12. The recorder is then switched to the next channel or pen color to await for the next switching state signal. It should be noted that it is not absolutely necessary that the switching means 22 be constructed and arranged to provide a normally closed circuit condition between terminals 13 and 14 and an open circuit condition therebetween upon actaution by cam portions 9. If desired, the switching means can be so constructed and arranged as to provide a normally open circuit between the terminals 13 and 14 and a closed circuit condition therebetween upon actuation. As will be appreciated by the artisan, either type of switching means 22 switching state configuration can be converted to the complementary state as required by the particular recording instrumentation used, simply by interposing a conventional switching state inverter device, such as a relay.

In the rotating kiln 1, the charge 4 therein will generally tend to lie against the lower portion of the kiln 1, with the free surface of the charge 4 being somewhat inclined to the horizontal in the direction of kiln rotation W, as results from the combined effect of gravity and tumbling of the charge material within the kiln 1.

Keeping in mind that as the kiln 1 rotates, different thermocouples 3 will assume angular positions where they are charge temperature sensing thermocouples 3a and then gas temperature sensing thermocouples 3b in repeated sequence, it is possible to monitor both charge 4 temperatures and gas temperatures simultaneously, simply by providing an additional control and sensing box 11' containing brushes 10', 12', a switching means 22', and terminals 13' and 14', respectively similar to their counterparts in box 11. The additional box 11' is located as at B where its associated brush 12' will contact segments 5 whose thermocouples 3b are out of contact with the charge 4 and are sensing gas temperatures. Accordingly, the location A of box 11 is chosen so that the brush 12 contacts segments 5 whose thermocouples 3a are covered at least partially by the charge 4.

As previously mentioned, the 24 thermocouples 3 illustrated in FIG. 1 do not have to lie in the same axial station plane, and in general can be at any desired angular position with respect to the reference plane R. However, to assure that the segments 5 when passing in contact with brush 12 will carry the temperature signals of thermocouples 3a sensing charge temperatures, and the segments 5 then passing in contact with brush 12' will carry the temperature signals of thermocouples 3b sensing gas temperatures, the thermocouples 3b are preferably arranged at angular positions approximately the same as their corresponding segments 5. With such an arrangement, for the case of a kiln 1 which is driven on support rollers 15 for rotation about a generally horizontal axis X, thermocouples 3 located at different axial station planes, but on a common radial plane through axis X, will sense charge 4 temperature and gas temperature at the same rotation attitude of the kiln 1.

It should be noted that the invention thus permits the simultaneous monitoring of charge 4 temperature and gas temperature within the kiln 1 using only a common ground slip ring 6 and a single segmented slip ring 21. In general, additional brushes (not shown) similar to the segment sensing brushes 12, 12', can be provided for simultaneous sampling of a corresponding number of additional temperature signals sequentially appearing at different locations around the circumference of the same slip ring 21. The ground sensing brush 10 need not actually be duplicated as by the brush 10' for location B, since the slip ring 6 is electrically continuous over its circumference and only one rotary ground connection to the external recorder need be provided, and this ground connection is already provided by brush 10 alone and is sufficient for recording by sampling signals at a plurality of angular locations around the kiln axis X. However, the duplicate brush 10' may be expedient since it dispenses with the need for running an extra ground lead back to brush 10 where two separate recorders are used for recording temperature signals sensed at locations A and B.

If desired, a single multichannel-recorder can be connected in alternation to the brushes 12 and 12' so that the maximum charge 4 temperature and the gas temperature sensed at locations A and B respectively can be recorded in a side-by-side relation on a common multichannel recording medium.

The apparatus of the invention is also suitable for a direct measurement of the degree to which the rotary kiln 1 is filled, including a measurement of the degree to which the kiln is filled at any location where a thermocouple 3 is provided. For this purpose, it is sufficient to sense and record the temperature distribution throughout the inside peripheral surface of the kiln lining 2. A sharp temperature drop will thus indicate the point where the sensing thermocouple enters the charge. Conversely, a sharp temperature rise will indicate the point where the sensing thermocouple emerges from the charge. When these two points have been determined, the degree to which the kiln is filled can be computed through the application of routine engineering calculations which can be reduced to parametric form for any given diameter kiln 1.

While in many applications of the invention, the use of cam portions 9 affixed to individual segments 5 may be preferable for performing the function of contacting the switch means 22, the invention is by no means restricted to actuating members carried directly by the slip ring 21 segments 5. Alternatively, the individual switch actuating members can be directly or indirectly connected to the periphery of the kiln 1 by any suitable means and need not be on the same radius with respect to the kiln axis X as are the segments 5. In fact, the switch actuating members can even be located on a different axial station plane than the slip ring 21, provided that the switching means 22 is correspondingly located for actuation by such members.

For example, as schematically illustrated by FIG. 2, the switch actuating members 9a, 9b, 9c, etc., can be mounted in a plane that is axially offset from that of the segments 5a, 5b, 5c, etc., making up the segmented slip ring 21. However, to achieve the type of operation similar to that of the FIG. 1 apparatus, the angular spacings between such switch actuating members 9a, 9b, 9c, etc., are the same as the angular spacings between their associated segments 5a, 5b, 5c, etc. This of course does not mean that the entire circumferential pattern of switch actuating members 9a, 9b, 9c, etc., must be in angular registry with the pattern of corresponding segments 5a, 5b, 5c, etc., and by relocating the switching means 22 at a selected angular displacement with respect to the brush 12, a corresponding angular displacement between the switch actuating member and segment 5 patterns can be used.

In general, a plurality of segment sensing brushes, such as the brush 12, can be provided at fixed angular stations with respect to the rotation axis X for the purpose of sensing the temperature at corresponding locations within the kiln 1 that are fixed in angular attitude with respect to said axis X. For each fixed sensing brush, the temperature signal sampled thereby will always be that from a thermocouple 3 which is positioned at an angular attitude about axis X established jointly by the angular position of the sensing brush and the angular displacement between the thermocouple 3 and associated segment 5. Thus, for a uniform circumferential distribution pattern of thermocouples 3 and segments 5, the location at which temperature within the kiln 1 is sensed by a particular brush, will be constantly fixed in space with relation to the axis X, even though because of the rotation of the kiln 1, the signal representing temperature at such location is supplied in the form of a series of samples taken from many thermocouples one at a time as their respective segments 5 pass into contact with the sensing brush.

From the foregoing description of the invention in terms of a limited number of embodiments, it will become apparent to the artisan that the temperature measuring apparatus of the invention is susceptible of numerous modifications and variations all within the conceptual scope of the invention. However, the invention is intended to be limited only by the following claims in which I have endeavored to claim all inherent novelty.

What is claimed is:

1. An apparatus for measuring temperatures within a rotary kiln, which comprises an electrically continuous slip ring mounted on the kiln for rotation therewith, a slip ring subdivided into a plurality of electrically separate segments and mounted on said kiln for rotation therewith, a plurality of thermocouples each disposed at a characteristic location within said kiln for sensing the temperature thereat and generating an electrical signal voltage corresponding to such temperature, each of said thermocouples being conductively connected to said continuous slip ring and to a corresponding segment of said subdivided slip ring to apply its temperature signal voltage therebetween, a pair of conductive brushes, one disposed for wiping contact engagement with said continuous slip ring and the other disposed at a predetermined angular position about the kiln rotation axis for wiping contact engagement with the segments of said subdivided slip ring, one at a time, passing by said position as the kiln rotates, whereby the temperature signal voltages from the thermocouples associated with said segments are applied to and thereby sampled in sequence by said brushes, said brushes being disposed for connection to an external signal receiving means to transfer thereto said sampled temperature signal voltages, a switching means disposed at a predetermined angular position about the kiln rotation axis, and a plurality of switch actuating members mounted for rotation with said kiln and disposed in a predetermined angular spacing relation about the kiln rotation axis with respect to individually associated segments of said subdivided slip ring, said switch actuating members being defined by projecting portions extending from their respectively associated slip ring segments and integral therewith and disposed to pass one at a time into operative engagement with said switching means to effect a change in the switching state thereof in correlation with the passage of the segment associated with each switch actuating member into signal sampling contact with said brushes whereby the sampling of each thermocouple temperature signal voltage is accompanied by a correlated change in the switching state of said switching means.

2. The apparatus according to claim 1 wherein the brush which contacts the segments of the subdivided slip ring is disposed at an angular position about the kiln rotation axis to repeatedly sample the temperature signal voltages of thermocouples which, when their associated segments are in contact with said brush, are positioned in the lower portion of the kiln and normally covered by the charge material therein.

3. The apparatus according to claim 1 wherein the brush which contacts the segments of the subdivided slip ring is disposed at an angular position about the kiln rotation axis to repeatedly sample the temperature signal voltages of thermocouples which, when their associated segments are in contact with said brush, are positioned in a portion of the kiln freely exposed to the gaseous atmosphere therein.

4. The apparatus according to claim 1 including a support means for holding said brushes and switching means as a common assembly at their respectively predetermined angular positions about the kiln rotation axis.

5. The apparatus according to claim 1 wherein said switch actuating members are disposed in an angular spacing relation about the kiln rotation axis with respect to their individually associated slip ring segments to engage the switching means in advance of the arrival of each associated segment into contact with the brush which contacts such segments.

6. The apparatus according to claim 1 wherein said switch actuating members are disposed in an angular spacing relation about the kiln rotation axis with respect to their individually associated slip ring segments to engage the switching means simultaneously with the arrival of each associated segment into contact with the brush which contacts such segments.

7. The apparatus according to claim 1 wherein said switch actuating members are disposed in an angular spacing relation about the kiln rotation axis with respect to their individually associated slip ring segments to engage the switching means after the arrival of each associated segment into contact with the brush which contacts such segments and prior to the termination of said brush-segment contact to thereby provide a change of switching state in advance of the arrival of the following segment into contact with said brush.

8. The apparatus according to claim 1 including a plurality of conductive brushes disposed at predetermined angular positions about the kiln rotation axis and for wiping contact engagement with slip ring segments passing by such positions to simultaneously sample the temperature signal voltages of thermocouples successively arriving at corresponding angular positions as the kiln rotates.

9. The apparatus according to claim 8 including a switching means associated with each signal sampling brush and disposed in a predetermined angular relation with respect thereto about the kiln rotation axis for actuating engagement by switch actuating members associated with slip ring segments passing in contact with said brush to provide a correlated change of switching state accompanying each temperature signal voltage sampled by said brush.

References Cited
UNITED STATES PATENTS

| | | | |
|---|---|---|---|
| 2,303,843 | 12/1942 | Knoblauch | 73—351 |
| 2,428,129 | 9/1947 | Smith | 73—351 |

FOREIGN PATENTS

| | | |
|---|---|---|
| 1,193,859 | 5/1965 | Germany. |

LOUIS R. PRICE, *Primary Examiner.*

N. B. SIEGEL, *Assistant Examiner.*